(12) United States Patent
Thompson (10) Patent No.: US 12,479,530 B2
(45) Date of Patent: Nov. 25, 2025

(54) RECUMBENT BICYCLE WITH POWER INPUT ANALOGOUS TO STANDING TO PEDAL AN UPRIGHT BICYCLE

(71) Applicant: Ronald Alan Thompson, Bel Air, MD (US)

(72) Inventor: Ronald Alan Thompson, Bel Air, MD (US)

(73) Assignee: Ronald Alan Thompson, Bel Air, MD (US)

( * ) Notice: Subject to any disclaimer, the term of this patent is extended or adjusted under 35 U.S.C. 154(b) by 819 days.

(21) Appl. No.: 17/840,177

(22) Filed: Jun. 14, 2022

(65) Prior Publication Data

US 2023/0008724 A1 Jan. 12, 2023

Related U.S. Application Data

(60) Provisional application No. 63/219,523, filed on Jul. 8, 2021.

(51) Int. Cl.
*B62K 3/00* (2006.01)

(52) U.S. Cl.
CPC .................................. *B62K 3/005* (2013.01)

(58) Field of Classification Search
CPC ...................................................... B62K 3/005
See application file for complete search history.

(56) References Cited

U.S. PATENT DOCUMENTS

| | | |
|---|---|---|
| 2,505,464 A | 4/1950 | Louis |
| 3,282,605 A | 11/1966 | Nihlean et al. |
| 3,910,599 A | 10/1975 | Thomas |
| 4,270,766 A | 6/1981 | Thomas |
| 4,303,255 A | 12/1981 | Thomas |
| 4,730,840 A | 3/1988 | Goldmeier |
| 5,553,879 A | 9/1996 | Niemeyer et al. |
| 6,062,581 A * | 5/2000 | Stites ................. B62K 5/02 280/270 |

(Continued)

FOREIGN PATENT DOCUMENTS

| | | | |
|---|---|---|---|
| DE | 19736266 A1 | 2/1999 | |
| DE | 19838181 C2 * | 3/2003 | ............... B62K 3/00 |

(Continued)

*Primary Examiner* — Kevin Hurley
(74) *Attorney, Agent, or Firm* — Design IP (57) ABSTRACT

Disclosed is a high performance recumbent bicycle that allows the rider to add substantial hand power by pulling the fork mounted crankset, about the steering axis, into foot pedal thrusts. The effect is superior to standing to pedal an upright bike, because the rider can provide power immediately, while remaining comfortably, safely and aerodynamically seated. Effective pedal force reaction is provided. Torque and work based hand power input methods are used. No supplemental mechanism is necessary. An embodiment has front wheel drive, a vertical steering axis, crankset offset ahead of the steering axis by a crankarm length, fork assembly rigid in torsion to rider hand and foot forces applied in opposition, and indirect steering mechanism which enables rider, grip, and pedal location and orientation for effective supplemental hand power input, and control of pedal forces on the steering. The enhanced steering control allows use of an aerodynamic disk front wheel.

16 Claims, 8 Drawing Sheets

(56) References Cited

U.S. PATENT DOCUMENTS

| | | |
|---|---|---|
| 6,419,254 B1 | 7/2002 | Langen |
| 6,565,106 B2 | 5/2003 | Lopez |
| 7,246,809 B2 | 7/2007 | Rutkowski |
| 7,311,321 B2 | 12/2007 | Rutkowski |
| 7,753,388 B2 | 7/2010 | Tolhurst |
| 9,139,254 B2 | 9/2015 | Garnet |
| 9,656,714 B2 | 5/2017 | Vulk, Jr. |
| 11,142,274 B1 | 10/2021 | Thompson |
| 2003/0057674 A1 | 3/2003 | Lopez |

FOREIGN PATENT DOCUMENTS

| | | | |
|---|---|---|---|
| DE | 102004019621 | 3/2007 | |
| DE | 102015015996 B3 * | 3/2017 | |
| DE | 102021003092 A1 * | 12/2021 | |
| EP | 2969732 B1 * | 4/2021 | ............. B62J 43/13 |

\* cited by examiner

RECUMBENT BICYCLE WITH POWER INPUT ANALOGOUS TO STANDING TO PEDAL AN UPRIGHT BICYCLE

CROSS-REFERENCE TO RELATED APPLICATIONS

This non-provisional patent application claims the benefit of and priority to U.S. Provisional Patent Application No. 63/219,523, filed on Jul. 8, 2021, which is incorporated herein by reference in its entirety to provide continuity of disclosure. U.S. Pat. No. 11,142,274 B1, issued on Oct. 12, 2021, is also incorporated herein by reference in its entirety to provide continuity of disclosure.

FIELD OF THE INVENTION

The present invention relates to a recumbent bicycle, particularly with propulsion by both hand and foot power.

BACKGROUND OF THE INVENTION

The following is a listing of some prior art that presently appears relevant: US Patent Application Publication No. 2003/0057674A1; U.S. Pat. Nos. 2,505,464; 3,282,605; 6,419,254 B1; 7,246,809; 7,311,321 B2; 3,910,599; 4,270,766; 4,303,255; 4,730,840; 5,553,879; 6,565,106; 7,753,388; 9,139,254 B2; 9,656,714 B2; and 11,142,274; and Foreign Patent Nos. DE 19736266A1 and DE102004019621B4.

The history of bicycle development shows there is an ongoing need for improvements which increase the power the rider can apply, particularly for acceleration and climbing hills, and which increase efficiency, speed, comfort, and safety. Better bikes could be used by more people for transportation, recreation, fitness and sport.

As described in the Applicant's prior patent, U.S. Pat. No. 11,142,274, bicycle development began with the original Drasiene, patented in Germany in 1818, in which the rider pushed directly against the ground with their feet. A second generation of bicycle, which became popular later that century, added pedals to directly drive the front wheel. Early, heavy versions were known as "Boneshakers" and later, as they became more refined, as "Highwheelers." Late in the 1800's, the "Safety Bike" was developed and became very popular. This rear wheel drive configuration is fundamentally similar to most bicycles commonly available today. Although never as widely adopted, "Recumbent Bicycles" which seat the rider in a more horizontal position, were first seen shortly thereafter.

Bicycles through history can be classified, by their means of propulsion, into three distinct generations. The push powered Draisene was the first generation (G1). The pedaled, front wheel drive Boneshaker and High Wheel bicycles together formed a second generation (G2). The currently familiar, rear wheel drive bicycle forms the third generation (G3). Additionally, as most recumbents have rear wheel drive, they can be classified as a subset of this third generation.

An important historical note is a public letter of 1885 by J. K. Starley, who was a prominent manufacturer of the G2 High Wheeler and was an early manufacturer of the G3 Safety Bike, which he called the "Rover". As quoted in the book, "A History of Rover Bicycles" by Pinkerton and Roberts, page 36, Starley says: "The Rover is absolutely the outcome of a determination to obtain advantage previously unknown in a bicycle. We felt confident that a large percentage of unused power could be utilized if the rider were properly placed, particularly with regard to hill-climbing. In this we were not mistaken, as the enormous success of the Rover undoubtedly proves." Here, Starley asserts that the ability to stand and pedal the safety bike was the key reason for the popularity and commercial success of the G3 over the G2 configuration. Standing to pedal a High Wheeler was unsafe so not done.

Standing to pedal, for bursts of power, acceleration and climbing continue to be a major benefit of conventional upright bicycles. Although the best recumbents provide superior aerodynamic efficiency, speed, comfort and rider safety, they do not allow the benefit of standing to pedal.

BRIEF SUMMARY OF THE INVENTION

The embodiment resolves a longstanding deficiency of recumbent bicycles by allowing the seated rider to use a combination of both upper and lower body muscles to provide power. This is very much like when an upright bicycle rider stands to pedal.

Standing to pedal an upright bicycle allows the rider to add substantial, supplemental upper body or "hand" power. Standing first provides additional body weight required as reaction for increased foot pedal force. If the rider then forces the handlebars sideways, the bike and the attached foot pedal crankset both tilt. When the tilt is coordinated against a foot pedal stroke, the crankshaft endpoint moves against the attached crank arm, which creates torque that urges crankshaft rotation. This motion also changes the center point about which the crank arm is rotating, reducing the rider foot perimeter distance traveled, constituting hand work. As the rider continues to spin the pedals, this torque and work both contribute hand power. Bicycle steering relies on both azimuth and roll control. Turning the front wheel about the steering axis changes azimuth, tilting the bicycle about the tire-to-ground contact points changes roll. As the upright rider uses bicycle roll to add hand power, the embodiment rider uses azimuth. The embodiments allow substantial hand power to be added by pulling the fork mounted crankset, about the steering axis, into the foot pedal thrust.

The longstanding need for recumbent bicycle supplemental hand power is demonstrated by an extensive body of USPTO prior art, which use supplemental mechanisms for hand power input. A problem is that the burden imposed by the mechanism is constant, but the utility is only intermittent. An important attribute of the embodiment is that it requires no mechanism for hand power input other than that used to steer and pedal.

The combination of hand and foot input, which is a process of pedal steering interaction, also results in enhanced steering control. This in turn allows routine use of an aerodynamic solid disk front wheel, even in blustery wind conditions.

The embodiment uses a leverage ratio to allow hand forces to control stronger foot forces. As with an upright, force on the handlebar grips is applied along a distance, to a fulcrum, and then along another distance to the foot pedal crankset. Configuring these distances and fulcrum provide the needed leverage. The embodiments use the steering axis as a fulcrum. For efficiency, rigid structure is provided along the lever arm distances. Front wheel drive and steering reduces these distances, thereby saving weight.

Use of indirect steering mechanism allows the rider, the hand grips and the foot pedals to be located and oriented so that hand and foot forces are applied most effectively, necessary force reactions are provided, and pedal force feedback is controlled. Hand or foot lateral displacement during hand power input is inefficient. To control hand grip lateral displacement, standoff is limited so that grips are aligned with their axis of rotation. To provide necessary reaction and to allow maximum force level input, hand and foot forces are applied in direct opposition. The vertical steering axis, a parallel handlebar axis of rotation, and perpendicular alignment of the riders foot pedal force input with the steering axis all facilitate hand and foot power input. A vertical steering axis also enhances embodiment low speed handling stability. Prior art teaches an inclined steering axis to control pedal force feedback.

Limiting the crankset displacement ahead of the steering axis also facilitates hand power input. An embodiment limits the crankset standoff distance to the length of the crankset crank arm. When pulling the crankset into the pedal thrust, the crank arm length offsets the crankset displacement. This is an effective balance that allows excellent hand power input and provides pedal force feedback control.

An embodiment also positions the rider seat height below the crankset height so that the peak phase of foot pedal force input is applied while the crank arm offsets the crankset displacement, which is the range of lowest pedal lateral offset. This maintains the leverage ratio for effective hand power input and pedal force feedback control.

The seat is readily adjustable for rider leg length and to vary the angle of recline. This allows a single frame size to fit most riders. The same bike can also be adjusted for a more relaxed upright rider position, or for a more aerodynamic highly reclined seatback angle. This adjustability teaches against FWD recumbent prior art which rigidly fixes the seat so as to better provide foot pedal force reaction.

These attributes are subject to trade as embodiments are configured for alternative applications.

The embodiments provide the best attributes of both upright and recumbent bicycles. Front wheel drive and steering allow the rider to be effectively integrated, to generate, and to efficiently apply hand and foot power, and to manage foot pedal force feedback. Since the rider does not have to stand, power can be applied immediately for bursts of acceleration and climbing. The embodiment also provides the aerodynamic efficiency, rider comfort and safety of the best recumbent bicycles. The embodiments provide balanced high performance and a new and satisfying ride experience. They are a fundamentally new type of bicycle, a Fourth Generation Bicycle.

DETAILED DESCRIPTION OF THE INVENTION

The following list of annotations numbers and the corresponding elements to which they refer is provided as a reference.

Figure 1:
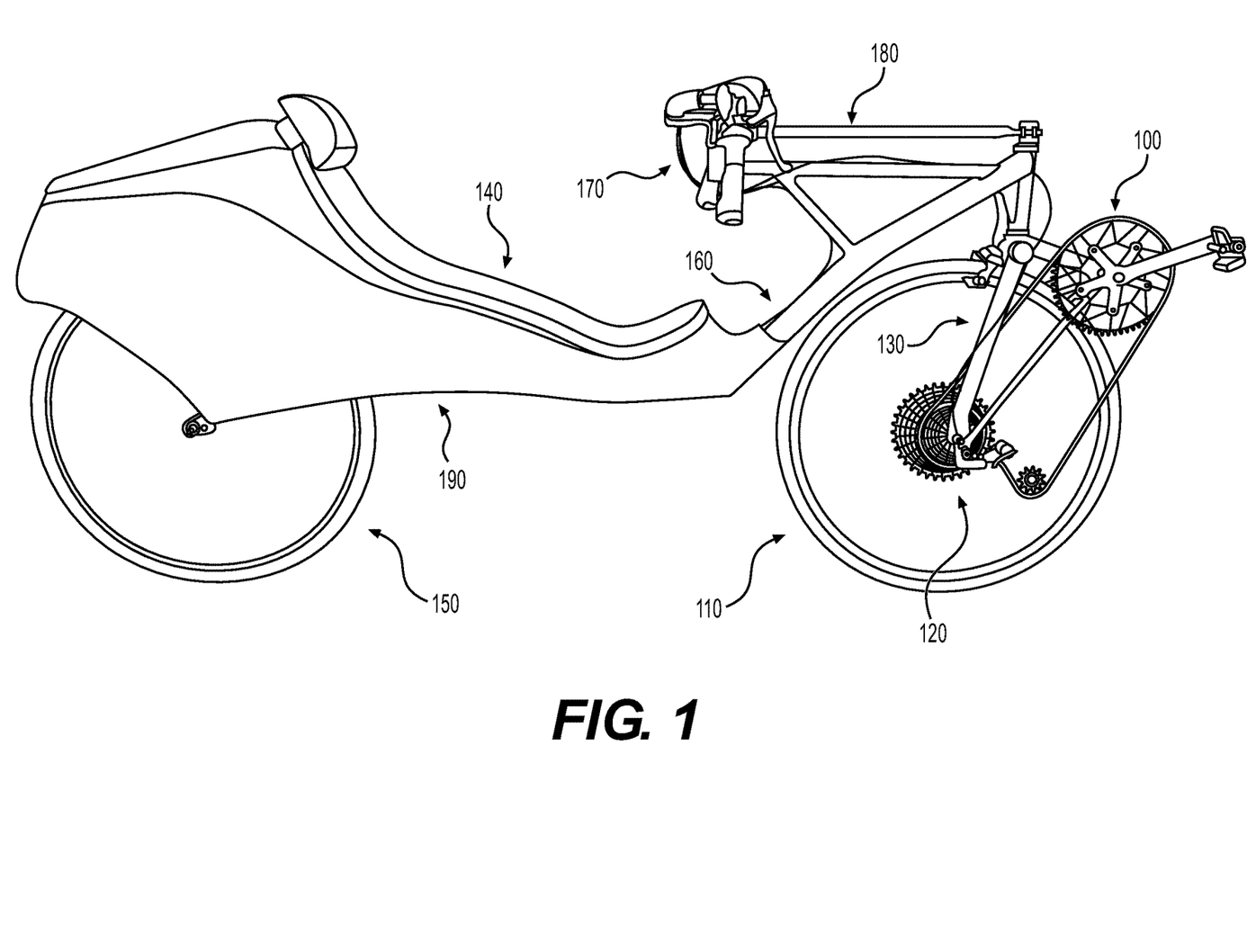
FIG. 1 shows an embodiment of the invention with crankset offset.

100 pedal crankset assembly
110 front wheel assembly
120 power transmission assembly
130 front fork assembly
140 seat assembly
150 rear wheel assembly
160 frame assembly
170 handlebar assembly
180 indirect steering assembly
190 fairing assembly
200 fork assembly
202 fork crown
203 lower headset bearing
204 horizontal handlebar tube
205 head tube
206 upper headset bearing
207 down tube
208 seat rail
209 rear fork
210 steering axis
212 steerer tube
220 trail
250 front wheel attachment
255 rear wheel attachment
270 sliding seat attachment and clamp
272 seat
273 seat attachment tab
274 seat support and recline adjustment
276 head rest pad
278 seat pad
280 front brake
285 rear brake
290 clamp for sliding handlebar support assembly
300 sliding handlebar support assembly
302 telescoping stem
304 upper bearing 305 handlebar head tube
306 lower bearing
310 handlebar vertical stem assembly
312 handlebar horizontal stem clamp
314 handlebar vertical stem
316 handlebar crank arm
318 handlebar pivot tube
319 handlebar axis of rotation
320 steerer tube clamp and crank arm
330 left connecting rod
340 right connecting rod
341 right hand thread ball end connector
342 lock nut
343 tube threaded end
344 tube
345 tube threaded end
346 lock nut
347 left hand threaded ball end connector
400 handlebar
402 left hand grip
403 right hand grip
404 shifter
406 left brake lever
407 right brake lever
408 left rear view mirror
409 right rear view mirror
410 handlebar horizontal stem
430 fork crown
431 crankset offset boom
432 bottom bracket shell
434 left fork blade
435 right fork blade
436 left chain stay
437 right chain stay
440 crankshaft
441 left crankshaft endpoint
442 right crankshaft endpoint
443 left crank arm
444 right crank arm
445 bottom bracket bearing assembly
446 left pedal
447 right pedal
460 chainring
461 chain
462 derailleur
463 cassette
610 right hand pull
620 torque about steering axis due to right hand pull
630 translation force on crankshaft
640 right foot force
701 right foot pedal position
711 right foot pedal position
721 right foot pedal position
610 right hand pull force
731 right handgrip position
741 right handgrip position
751 right handgrip position
760 pedal perimeter path with front wheel pointed forward as in FIG. 7B
770 pedal perimeter path with front wheel at 15 degrees left as in FIG. 7A
780 pedal perimeter path with front wheel at 15 degrees right as in FIG. 7C
810 conventional upright bicycle left pedal power input
812 power input starts
814 power input ends
816 peak power input starts
818 peak power input ends
820 conventional upright bicycle right pedal power input
840 recumbent bicycle left pedal power input
842 power input starts
844 power input ends
846 peak power input starts
848 peak power input ends
850 recumbent bicycle right pedal power input
870 embodiment bicycle left pedal power input
872 power input starts
876 peak power input starts
878 peak power input ends
880 embodiment bicycle right pedal power input FIG. 1 shows the fork mounted crankset with offset distance limited to the crankarm length, indirect steering, and vertical steering axis that allows effective hand power input.

Figure 2:
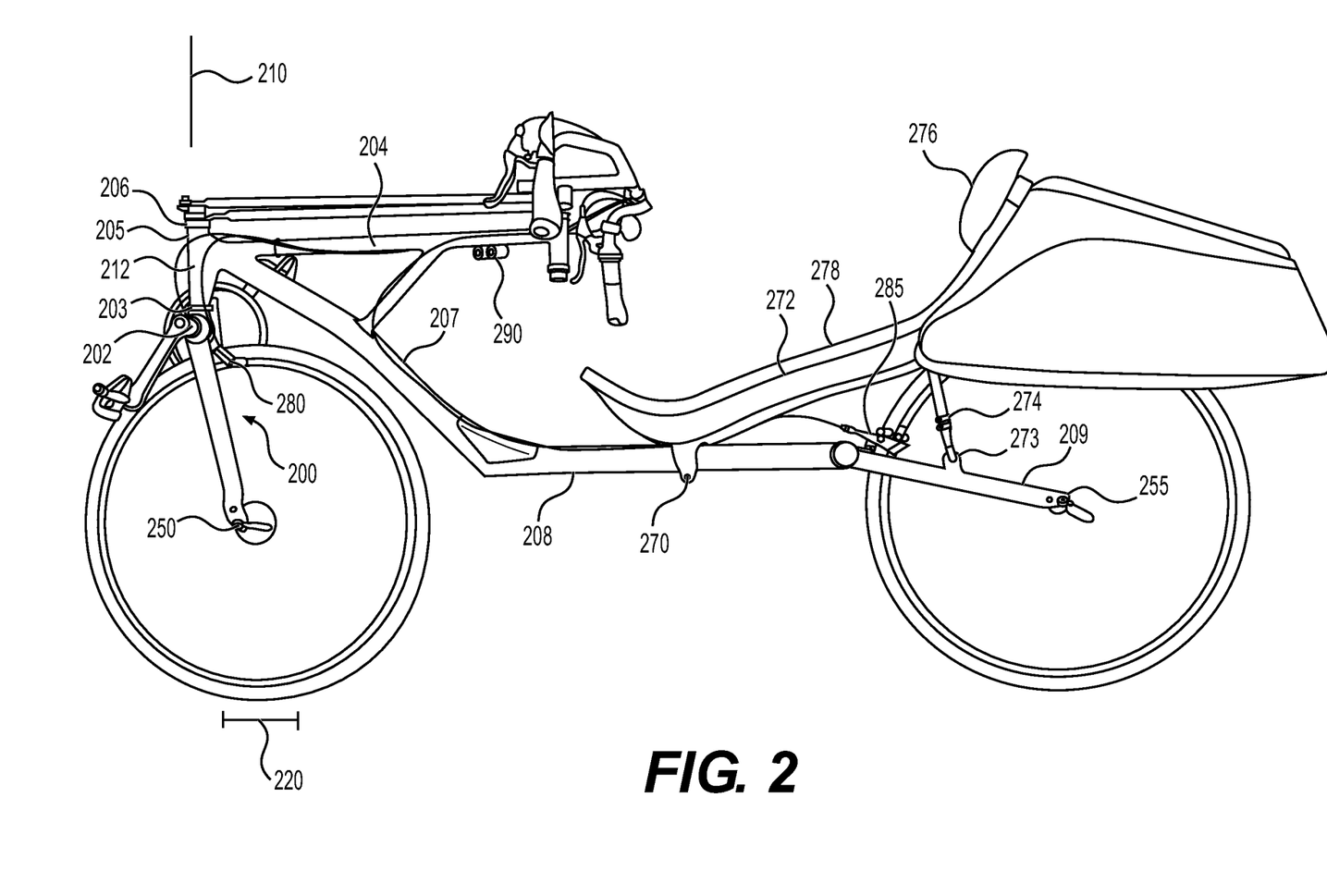
FIG. 2 shows an alternative embodiment without crankset offset and with only a partial rear aerodynamic fairing.

FIG. 2 is a second unique embodiment having a front fork assembly that mounts the crankshaft on the steering axis. This embodiment also shows a less extensive rear fairing, thereby exposing additional components for description. These two embodiments, other than the forks, seat and handlebar adjustments necessary for the crankset location, are otherwise identical. Description provided herein, otherwise, applies to both embodiments.

Figure 3:
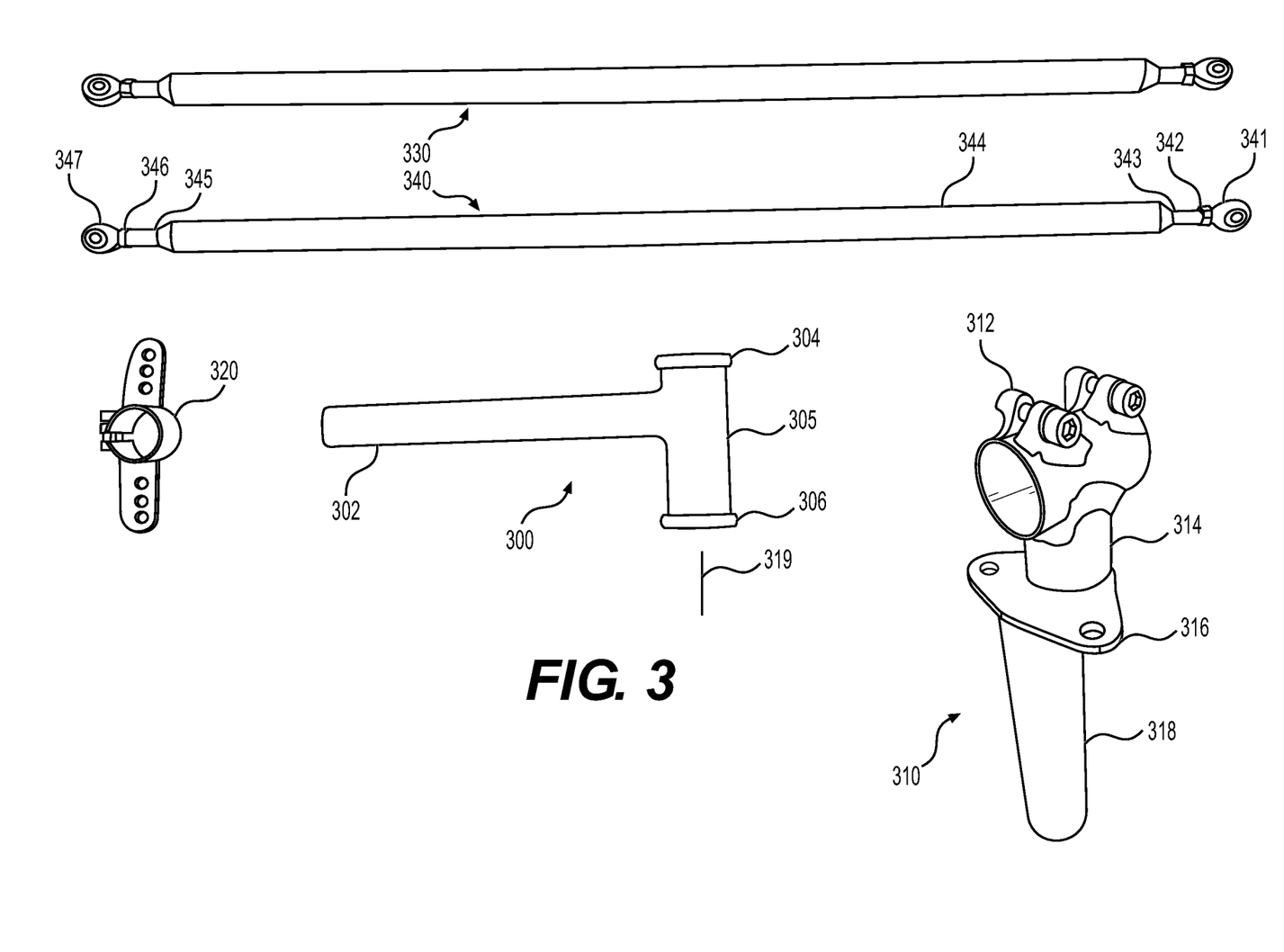
FIG. 3 shows indirect steering mechanisms from an embodiment of the invention.

FIG. 3 shows in more detail the indirect steering mechanism components used on an embodiment.

Figure 4:
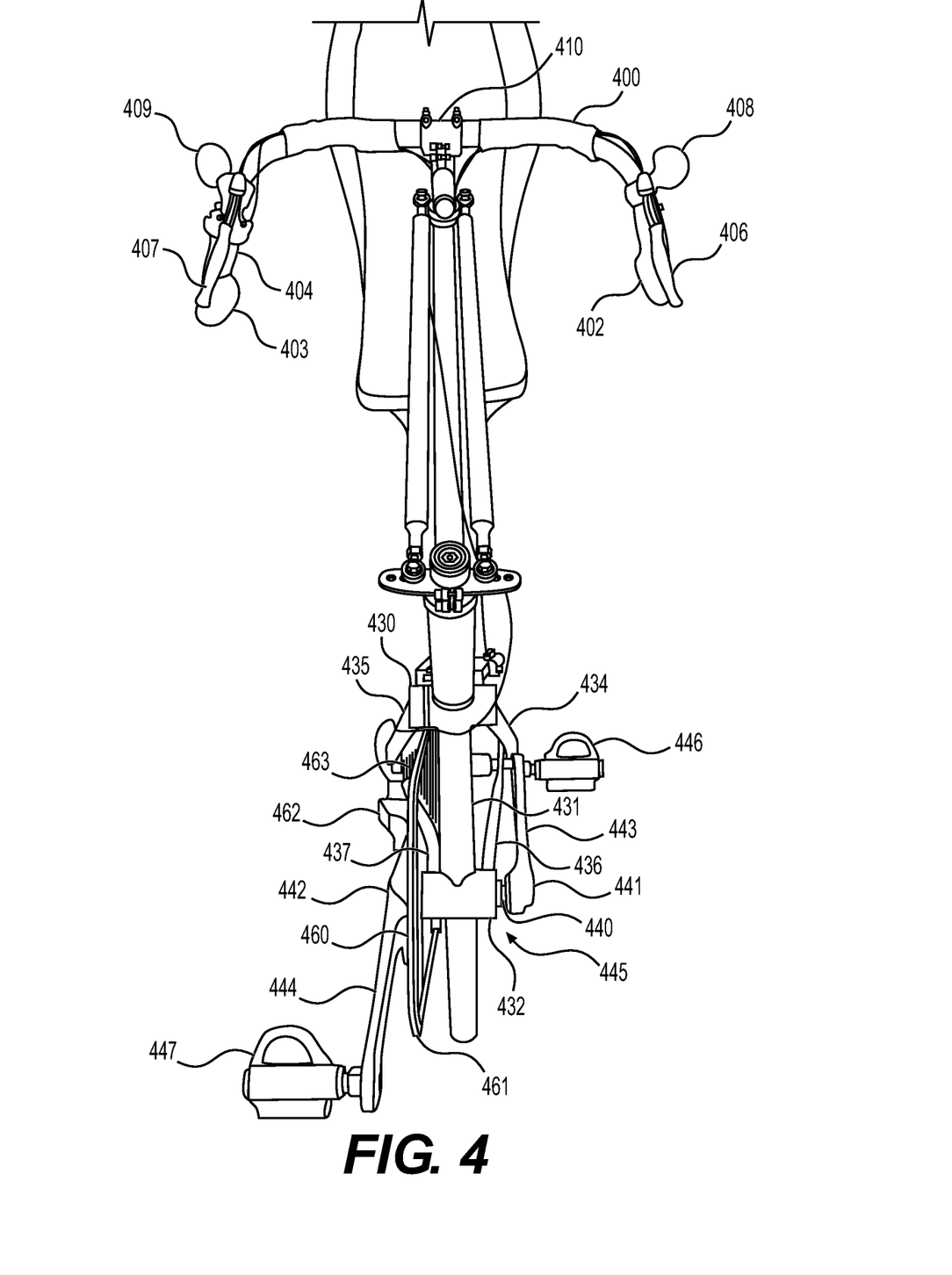
FIG. 4 shows an elevated front view of an embodiment of the invention.

FIG. 4 shows an elevated front view of an embodiment.

Figure 5:
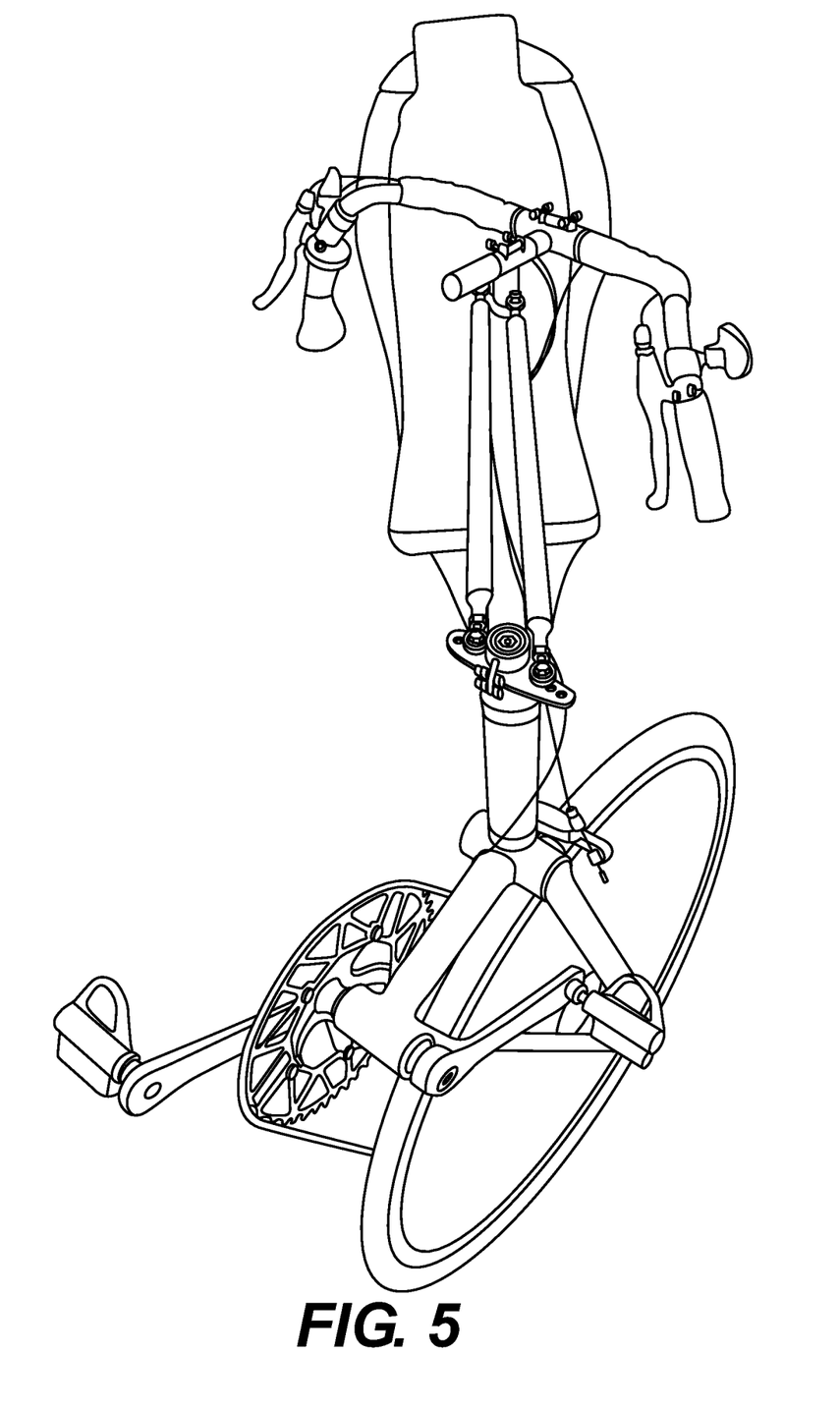
FIG. 5 shows an embodiment of the invention with steering and pedals positioned to explain function of a limited crankset offset.

FIG. 5 shows an alternative elevated front view with steering and pedals positioned to explain the benefit of a limited crankset offset.

FIGS. 6A-C and 7 A-D illustrate the means by which supplemental hand power is applied to the embodiments. FIG. 6 shows hand force input which provides power as supplemental torque. FIG. 7 shows hand induced displacements which provides power as supplemental torque and work. The configurations shown in FIGS. 6 and 7 are simplified functional representations of an embodiment having the foot pedal crankset at the center of the front wheel. This is described in the Applicant's patent U.S. Pat. No. 11,142,274. This method of operation and function is applicable to embodiments disclosed in this application.

Figure 8A:
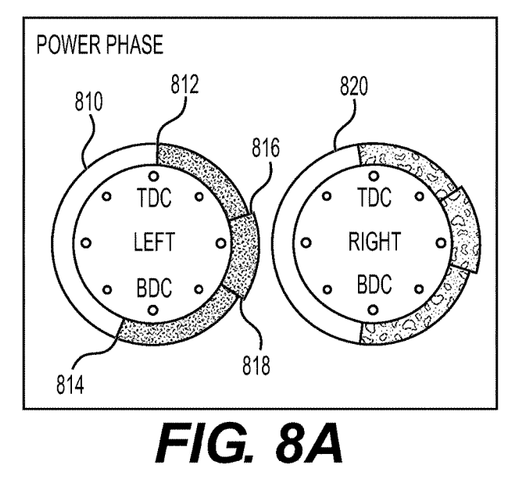
FIG. 8A shows a diagram representing conventional upright bicycle pedal power and peak or surge power data.
Figure 8B:
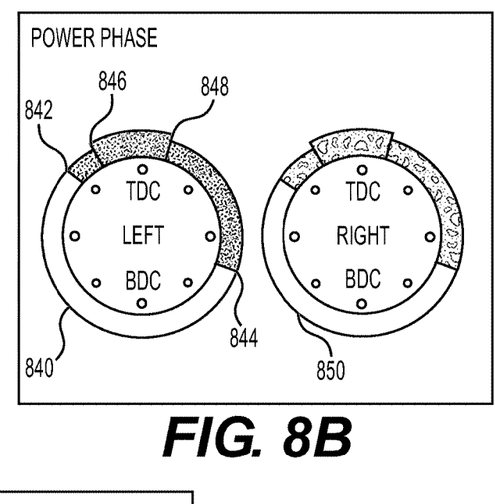
FIG. 8B shows a diagram representing a recumbent bicycle pedal power and peak or surge power data.
Figure 8C:
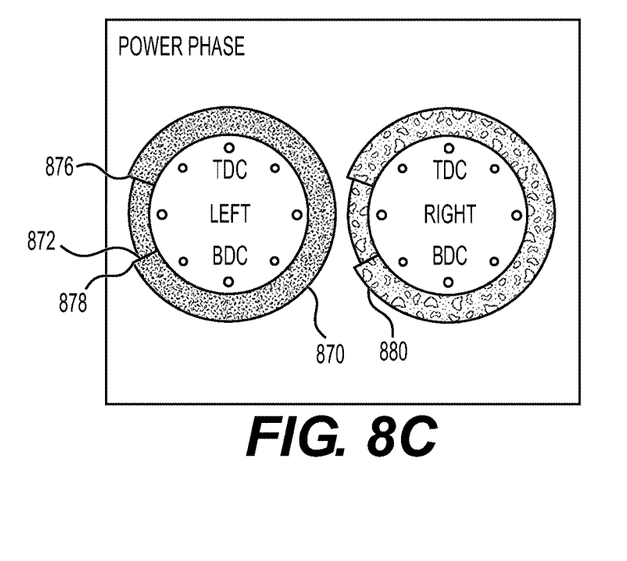
FIG. 8C shows a diagram representing power and peak or surge power data from an embodiment of the present invention.

FIGS. 8A-C shows measured data from a commercial bicycle-pedal-based power measurement system. These figures are provided to demonstrate the hand power that is applied to embodiments. FIG. 8A shows baseline data for a typical commercial upright racing type bicycle, FIG. 8B for the Applicant's recumbent bicycle of U.S. Pat. No. 11,142,274, FIG. 8C for the embodiments of this application.

Materials, components and methods of making the embodiments are typical of those used for currently available bicycles and are well known. Although the embodiment illustrated is made primarily of welded, brazed and/or machined steel and aluminum, and carbon fiber with epoxy resin, the full range of materials typically used for bicycles could be used. They include titanium and advanced fiber-epoxy-composites of carbon, fiberglass and/or Kevlar. Any information necessary to understand, build or use the embodiment, beyond that of standard practice is disclosed.

For the embodiments shown, the wheelbase is 60 inches, the steering axis angle is vertical, and trail is 4 inches. The embodiment as shown is fitted to a rider 75 inches tall.

Referring now to FIG. 1, the assemblies shown include a pedal crankset 100, front wheel 110, power transmission 120, front fork 130, seat 140, rear wheel 150, frame 160, handlebar 170, indirect steering 180, and fairing 190. These assemblies are briefly described below and then more clearly shown and further described in associated discussion of FIGS. 2-5.

The pedal crankset 100 is a typical commercial assembly. The crankset is attached to the front fork via a standard bottom bracket shell.

The front wheel 110 is a typical commercial rear wheel assembly. Attachments to the fork and to the power transmission are typical of commercial rear wheels.

The power transmission 120 is a typical commercial 1 by 12 system with crankset, 54 tooth chainring, chain, derailleur and 11×50 tooth cassette assembly.

The front fork assembly 130 is shown and further described in FIGS. 4 and 5. The front fork attaches to the frame via steerer tube 212 and a commercial headset bearing assembly attached to the frame head tube 205. The front wheel is attached via standard commercial attachments 250. The power transmission assembly derailleur 462 attaches to the fork at the right side wheel attachment as is standard practice.

The seat assembly 140 is further described in FIG. 2. The seat attaches to the frame.

The rear wheel assembly 150 is a typical commercial bicycle front wheel, a disk version, which is known primarily for indoor use, is shown. The wheel attaches to the frame assembly 160 using standard commercial attachments 255 typically used for a bicycle front wheel.

The handlebar assembly 170 is best shown and described in association with FIG. 4. This assembly attaches to the frame by the sliding handlebar support assembly 300 and is attached to the front fork assembly 130, by the indirect steering assembly 180.

The indirect steering assembly, which is best shown and described at FIG. 3, attaches the front fork 130 and handlebar 170 assemblies.

The fairing assembly 190 is known, attached to the seat 140 and the frame, and not further described.

Referring now to FIG. 2, there is shown an alternative embodiment having the crankset on the steering axis and a partial rear aerodynamic fairing. The fork assembly 200 of the embodiment of FIG. 2 locates the crankshaft 440 axis of rotation perpendicular to and in alignment with steering axis 210. That is, the crankset assembly 100 has no offset from the steering axis. The fork configuration key components include a steerer tube, crown seat, crown, fork blades and attachments for the wheel. This fork fits a standard rear wheel, the right side attachment includes a derailleur attachment. As these elements are known, they are not shown in detail. The fork crown 202 includes a standard bottom bracket shell attached to the crankset bottom bracket bearing assembly 445.

The head tube 205 is of a standard commercial configuration. The head tube is attached to and is part of the frame. The fork steerer tube is supported coaxially in the head tube by standard lower 203 and upper 206 headset bearings. The resulting axis of rotation formed is the steering axis 210. The steerer tube 212 (not explicitly shown) is concentric with the steering axis, is within the head tube 205 and connects the fork crown 202 and steerer tube clamp and crank arm 320. The embodiments of FIGS. 1 and 2 both use a 90 degree (vertical) steering axis. Trail 220 is the distance between the steering axis and the front tire contact point.

The frame assembly is of 4130 steel tube welded construction. The frame supports the seat, rear wheel and sliding handlebar support 300 assemblies. The frame includes a head tube that receives the front fork steerer tube such that a front wheel steering axis is created about which the front fork assembly is free to pivot with respect to the frame. The steering axis is an imaginary line concentric with the steerer tube and head tube. The assembly includes the down tube 207 that connects the head tube to the seat rail 208 and then to the rear fork 209. The rear fork contains a right and left seat attachment tab 273 and standard wheel attachment 255 typically used on a front wheel.

The commercial seat 272 is shown reclined at an angle of about 20 degrees. It is molded of carbon fiber and epoxy resin. As is common practice, the seat is shown in each figure with a pad 278 and a head rest 276 for added comfort. The sliding seat attachment and clamp 270 attaches the seat to the frame seat rail. This attachment allows the seat to slide to adjust rider distance to the pedals, and allows the seat to tilt for recline adjustment. The seat is also attached to the seat attachment tab and rear fork, by the commercial telescoping seat support and recline adjustment 274.

Because of the upper body reaction to pedal forces inherent in hand power input, the level of foot pedal force reaction against the seat is less than that of a standard recumbent.

Conventional cantilever brakes 280 and 285 are used for the front and rear wheel. Other types can be used.

The embodiment uses standard front and rear wheel and tire assemblies. Both are 700 c×32 mm. Standard full size wheels are used to facilitate a smooth ride and low rolling resistance. Equal size tires allows the rider to purchase and carry only one size spare for emergency repairs. There is also an aesthetic appeal to front and rear wheel symmetry. Other sizes can be used.

For efficiency and speed, an embodiment uses aerodynamic disk wheels at the front and rear. Use of 700 c front disk wheels is not typical, even in competition, because it has proven to be hard to control. Enhanced steering control provided by an embodiment has allowed routine use of a front disk wheel over many miles of operation, including conditions that would be difficult for a conventional upright bicycle with a standard spoked aero front wheel.

The embodiment is recumbent because the frame establishes an angle between the steering axis and the general line of rider pedal force input, which is a line from the crankshaft to the riders hip, which is more perpendicular than parallel.

An embodiment uses a vertical steering axis. The vertical axis aligns hand and foot force inputs in opposition for effective reaction and hand power input. Steering azimuth and roll response is decoupled which enhances low speed handling stability, thereby facilitating rider access to the elevated foot pedal position. The vertical axis allows a shorter wheelbase and better front and back wheel weight load balance.

The angle between the riders pedal force input and the steering axis largely establishes the reaction vice transmission fraction of pedal and hand power input torques about the steering axis. More perpendicular angles create larger torques and allow increased hand force input. More parallel angles reduce the torque, increase frame reaction and reduce pedal force feedback. Prior art teaches more parallel angles. As transmission is required for pedal steering interaction and hand power input, an embodiment uses a vertical steering axis and a perpendicular force input. The parallel handlebar axis of rotation aligns hand and foot force input direction, in direct opposition, for efficient mechanical reaction and ergonomics.

The steerer tube is made of 4130 alloy steel 1.125" OD by 0.095" wall thickness. The fork tube is rigidly attached to the crown by welding. The fork structure is made rigid in torsion and bending to the combined forces of the riders hand and foot inputs, used in opposition, for propulsive input. This torsional rigidity extends from the hand grips to the crankshaft endpoints where the crank arms are attached.

Referring now to FIG. 3, there are shown major elements of an embodiment indirect steering mechanism. The sliding handlebar support assembly 300 attaches to the frame 204 horizontal handlebar and clamp tube. A telescoping clamped attachment 290 is used to attach the telescoping stem 302. The handlebar head tube 305 attached at the opposite end attaches to an upper and lower bearing set 304 and 306.

The Handlebar vertical stem assembly 310 rotationally attaches to bearings at 304 and 306. The handlebar pivot tube 318, handlebar crank arm 316, handlebar vertical stem 314 and handlebar horizontal stem clamp 312 are all rigidly attached. A handlebar axis of rotation 319 is formed.

The steerer tube clamp and crank arm 320 attach to the steerer tube 212. The alternative connecting rod attachment holes shown allow the hand over foot leverage ratio to be changed. Embodiment 1 uses equal width spacing in 320 and 316. The embodiment of FIG. 2, used wider hole spacing at 320 providing a 1:1.3 local leverage ratio.

The left and right connecting rod assemblies 330 and 340 attach the handlebar vertical stem assembly 310 and the steerer tube clamp and crank arm 320.

Mechanisms similar to that of the indirect steering assembly 180 are well known, as are the connector rod assemblies 330 and 340. Both of which are identical so only 340 is further described. Standard commercial ball end connectors are used at each end, 341 is right hand threaded and threads into the lock nut 342 and then into the tube threaded end 343 which is attached to the connector tube 344 and then into a similar left hand threaded arrangement at the opposite end using 345, 346 and 347.

The right and left hand threaded connector tube assemblies allow minor length adjustment within the limits of ball end thread lengths. The use of two rods allows adjustment in opposition to maintain the torsional rigidity from the hand grips to the crankshaft. Connector tubes can carry loads in both compression and tension.

Connector rod length must be adjusted for extended adjustment of the distance between the handlebar axis of rotation 319 and the steering axis 210, achieved by sliding 302 in 204. Replacement rods or rods with adjustment mechanism can be used.

The mechanism shown in FIG. 3 provides means for indirect steering, this is indirect coupling of the handlebar to the fork such that the handlebar axis of rotation can be both displaced from the steering axis and can transmit force and motion input to the steering axis thereby allowing more efficient application of hand power input. This allows both the foot pedals and hand grips to be located in reach of the rider and be oriented for effective power input and steering feedback control. Changes in rider size and in rider recline angle can be accommodated. The arrangement reduces lateral motion. Hand and foot pedal inputs are both directed primarily along, vice across, the bicycle length.

Alternative mechanisms are also well known and can be used. These include a single connector tube configuration, use of cables and cable guides in place of connector tubes, hydraulic lines, or chain.

Referring now to FIG. 4, there is shown an elevated front view of an embodiment of the invention. The handlebar assembly 170 includes the handlebar 400, which is about 24 inches wide across the hand grips. The handlebar position with respect to the rider allows effective attachment of small rear view mirrors 408 and 409. The left hand grip is attached at 402, the right hand grip with twist grip shifter is attached at 403 and 404. The left and right brake levers are attached at 406 and 407.

The handlebar is attached to the horizontal stem 410 and then to the horizontal stem clamp 312. This stem and clamp arrangement allow adjustment of the handlebar position along the length of the bike.

The front fork assembly 130 configuration and attachments are as described for front fork assembly 200 except the crankset is offset from the steering axis by 7 inches. The steerer tube 212 attaches to the crown 430, which attaches to the left 434 and right 435 fork blades. The crown also attaches to the crankset offset boom 431 and then to the 432 bottom bracket shell. The left and right chain stays 436 and 437 attach the bottom bracket shell to the fork blades. The chain stays reduce bottom bracket shell deflections from pedal and chain line induced forces and add torsional rigidity.

The bottom bracket shell attaches the bottom bracket bearing assembly 445 which in turn attaches the crankshaft 440 which is part of the overall crankset assembly 100. The left crankshaft endpoint is at 441 and the right at 442. These endpoints, respectively, connect the left and right crank arm 443 and 444 which in turn connect the left 446 and right 447 pedals. The right crankarm attaches to a chainring 460, the chainring drives a chain 461, through a derailleur 462, to a cassette 463 which is attached to the front wheel assembly 110.

The power transmission 120, along with elements of the crankset 100 and front wheel 110 assemblies, provide means for transmitting rotational power from the pedal crankset to the front wheel. Although the overall configuration is unique, these elements are well known. Alternative means are also available, including the chain drive configuration of the Applicant's U.S. Pat. No. 11,142,274, a hub gear as in U.S. Pat. No. 9,139,254, and belt and pulley drive.

Referring now to FIG. 5, there is shown an embodiment of the invention with steering and pedals positioned to explain function and benefit of a limited crankset offset. Limiting the distance that the crankshaft is offset ahead of the steering axis, to about the length of the crank arms, enhances hand power input and reduces pedal force feedback.

Figure 7A:
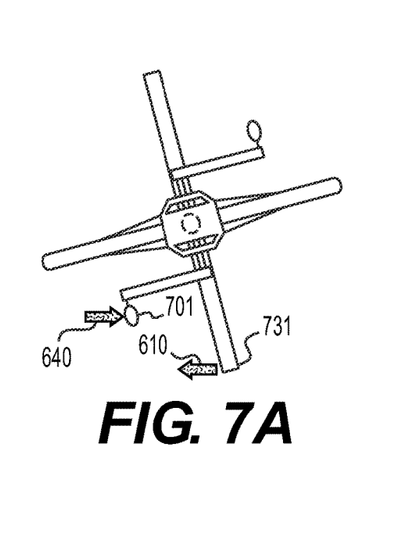
FIG. 7A shows a top view of an embodiment of the invention with coaxial crankset and front wheel to illustrate hand work input with a right foot starting position.
Figure 7B:
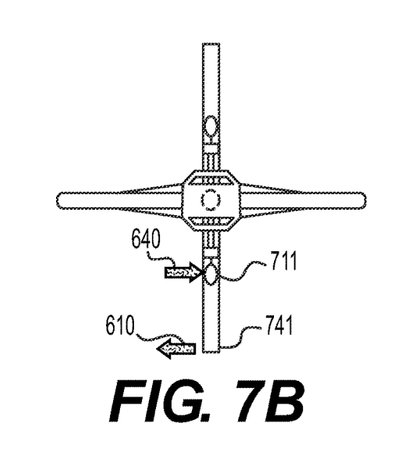
FIG. 7B shows a top view of an embodiment of the invention with coaxial crankset and front wheel to illustrate hand work input with an intermediate foot position.
Figure 7C:
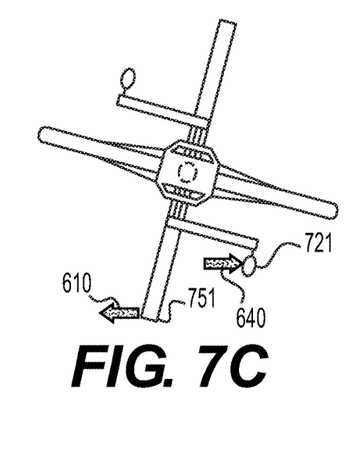
FIG. 7C shows a top view of an embodiment of the invention with coaxial crankset and front wheel to illustrate hand work input as right side power input ends and left side power input begins.

Hand power is input by pivoting the fork and crankset into the foot pedal thrust. Pivot angles can be in the range of plus and minus 15 degrees. This pivot angle range is shown in FIG. 7A-C.

Indirect steering is used to appropriately locate and orient the rider, the hand grips, and the pedals.

A hand over foot leverage ratio allows hand forces to control stronger foot forces. This leverage ratio is established, in large part, by the lateral distance from the handlebar grip to the handlebar axis of rotation, and by the lateral distance from the foot pedal body center to the steering axis. For the embodiment, the grip distance is 12 inches. The nominal pedal distance is 5 inches. This provides a leverage ratio of 2.4:1. This ratio has proven to be effective. Although the nominal pedal distance to the steering axis is 5 inches, that distance changes with pedal and fork rotation angle.

Hand force input is most effectively applied in direct opposition to foot power force input. Both hand and foot forces are applied primarily along the embodiment length. Hand or foot lateral motion is not efficient.

Hand grip lateral motion is minimized by aligning the hand grips and the handlebar axis of rotation. When the handlebar is turned, the grips follow a circular path and pivots about the axis. Lateral motion, particularly for small turn angles, is minimized and hand power is efficiently applied.

Control of the pedal lateral motion is more complex than for the hand grips because the foot pedals are rotating while the fork assembly is pivoted.

The embodiment of FIG. 2 is configured so that the foot pedals are centered on the steering axis of rotation, that is, the foot pedal crankshaft is located on the steering axis. Although the configuration allows effective hand power input, if the rider makes a sharp turn while pedaling, or while the pedal on the turn side is in the return position, the pedal crank arm can hit the bicycle frame.

The embodiment of FIG. 5, offsets the crankset ahead of the steering axis. The offset prevents the pedal crank arm from hitting the frame. The offset also provides a moment arm about the steering axis that reduces pedal force feedback; this is because normal pedaling also creates incidental lateral forces. These lateral forces, applied over the crankset offset moment arm length, beneficially help to control pedal force feedback to the steering.

Although the crankset offset results in unwanted pedal lateral motion, the effect is managed by limiting the crankset offset distance to that of the crank arm length. During hand power input, this allows the crank arm length to offset the crankset extension distance over the important foot-peak-power-input range of crankset rotation.

The crankset and fork positions shown in FIG. 5 correspond to the initiation of the riders left foot hand power input stroke. The rider will use hand force to turn the fork assembly from the right and pull the left pedal into their left foot thrust. In this process, as the fork is turned through the straight ahead position, the pedal is also rotated 90 degrees to the vertical. The process then continues until the fork is turned to the left and the pedal is rotated another 90 degrees to the forward position. The fork and pedals are now in position to repeat the process for a right foot hand power input stroke.

As shown in FIG. 5, as the hand power input starts, the pedal body center is at the nominal 5 inch lateral distance from the steering axis. This 5 inch lateral distance is maintained as the fork and pedal are rotated to the straight ahead and vertical positions. Only during the second 90 degrees do the crankset offset and crank arm length begin to increase pedal lateral offset distance. At a 15 degree angle of turn and full crank arm extension, the pedal lateral moment arm length increases from 5 to about 8.6 inches. Any additional crankset extension distance further increases that moment arm length, which reduces the hand over foot leverage ratio, limits the range that the fork can be pulled into the pedal thrust, and reduces the ability to add hand power.

As shown by FIGS. 8A & B, foot force level input varies with the crankshaft angle of rotation. Peak foot force input extends over a fairly narrow range of about 50 degrees. The pedal manufacturer suggests this range contains about 50% of the total foot power input applied. Although not shown in FIG. 8C, this is also true for the embodiment.

The phase of crankset rotation at which the peak foot power is applied is determined by the direction of the line of pedal force input, which is from the riders hip to the crankset centerline. For the embodiment, that line is inclined slightly up from the horizontal to the crankshaft. This causes the peak foot power input to be applied during the first 90 degrees of crank rotation. Importantly, this is also the range of crankset rotation at which the crankset distance from the steering axis and the crank arm length offset. This holds the pedal lateral separation distance to 5 inches, preserving the maximum leverage ratio and riders ability to add hand power. That is, the embodiment configuration allows the rider to apply peak supplemental hand power input while the problematic pedal to steering axis moment arm length is at a minimum.

Offsetting the embodiment crankset to about the same distance as the crank arm length has proven to be a very effective balance, resulting in excellent hand power input, PFF control, and overall performance, comfort, and safety.

Figure 6A:
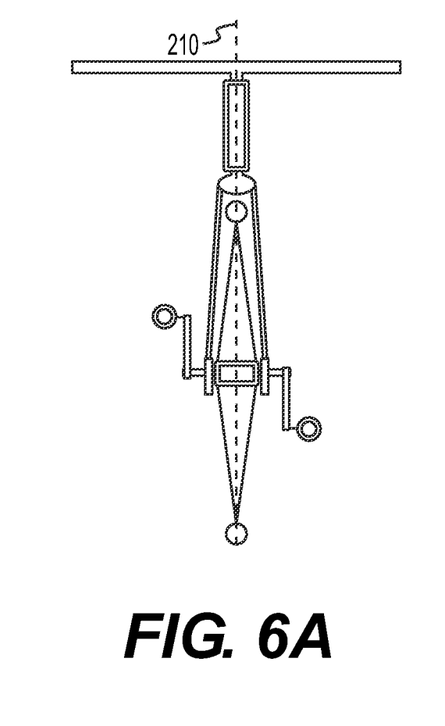
FIG. 6A shows a front view of an embodiment of the invention with coaxial crankset and front wheel to illustrate hand torque input.
Figure 6B:
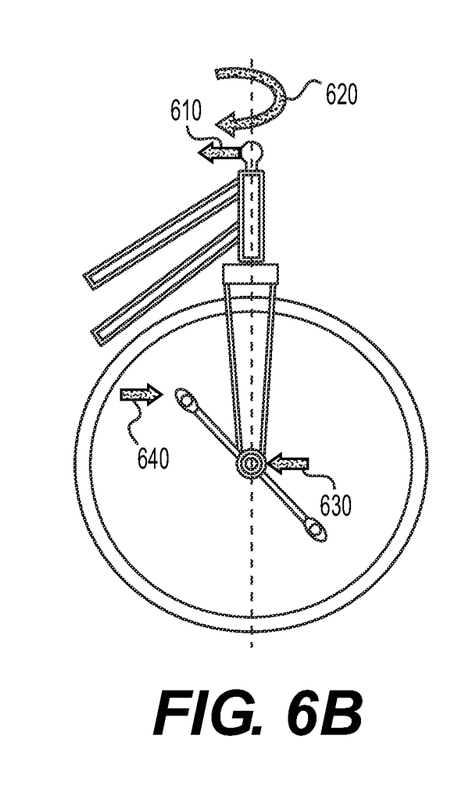
FIG. 6B shows a right side view of an embodiment of the invention with coaxial crankset and front wheel to illustrate hand force conveyed to the crankset.
Figure 6C:
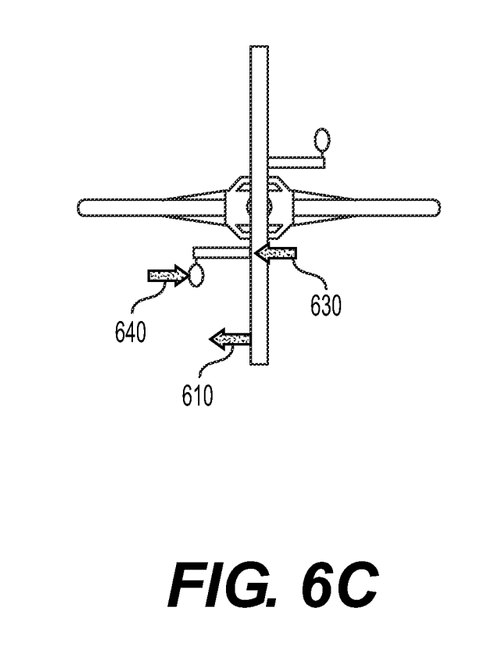
FIG. 6C shows a top view of an embodiment of the invention with coaxial crankset and front wheel to illustrate hand force conveyed to the crankset.

Referring now to FIGS. 6A-6C, there are shown multiple views of an embodiment of the invention with coaxial crankset and front wheel to illustrate hand torque input, in order to show how force is applied to the hand grips and is conveyed to the foot pedal crankset to provide supplemental hand power. The embodiment shown is a functional representation of a coaxial crankset configuration, as in the Applicant's U.S. Pat. No. 11,142,274. The figure and explanation are applicable as embodiments of the present invention.

FIG. 6A shows a partial front view of the embodiment. FIG. 6B provides a side view, partial frame tubes extend to the left, the seat (not shown) is to the left and the bicycle direction of travel is to the right. FIG. 6C is a top view.

The arrows of FIGS. 6B and 6C show the right side hand and foot force input points and directions, the left side process is similar, and both are repetitive as desired. The rider pulls against the right hand grip as shown by arrow 610 creating a torque about the steering axis 210 as shown by arrow 620. The torque is conveyed by the fork assembly to the crankset and urges translation of the crankshaft endpoint 630, which in turn urges rotation of the crankarm about the crankshaft. At the same time the foot force 640 causes pedal rotation of the crank arm about the crankshaft. These hand and foot forces add to provide the total torque on the crankshaft.

Referring now to FIGS. 7A-7D, there are shown multiple views of an embodiment of the invention with coaxial crankset and front wheel to illustrate hand work input. The process of hand work input using handlebar displacement is an extension of hand force input. Work is defined as the application of force over a distance. Here, the rider increases the level of hand force applied, as required to displace the handlebar and to actually pivot the crankshaft about the steering axis. This pivot is in coordinated opposition to the foot force on the pedal. This pivot translates the crankshaft end and thereby changes the point about which the pedal rotates during the pedal power input stroke. This change in center of rotation, which occurs while the rider is pedaling, decreases the perimeter distance traveled by the riders foot in the direction of pedal force application. Hand work input is proportional to this perimeter reduction.

This process of hand work application through crankset displacement is shown in FIGS. 7A-D. The figures are a continuation of those in FIG. 6. For clarity in FIGS. 7A-C, the handlebar is shown as transparent. The series of figures illustrate the riders right side power input process. In operation, the left side process is similar, and both are repetitive as desired.

FIG. 7A shows the initial position for application of hand power on the right side. The fork assembly is deflected about 15 degrees to the left. The rider's right foot pushes 640 against the right pedal while the right hand pulls 610 against the right handgrip. The approximate force and deflection directions are indicated by the arrows shown. At this point, the left hand grip and left foot pedal are positioned at the completion of the preceding left side stroke.

FIG. 7B shows the intermediate position where the fork assembly has been pulled back to a straight forward direction. The right foot continues to push while the right hand continues to pull.

FIG. 7C shows the right side finish position. The fork assembly is now pivoted about 15 degrees to the right. The right foot push and the right hand pull are complete. Note that the left hand grip and foot pedal are now positioned to start this repetitive process on the left side.

Figure 7D:
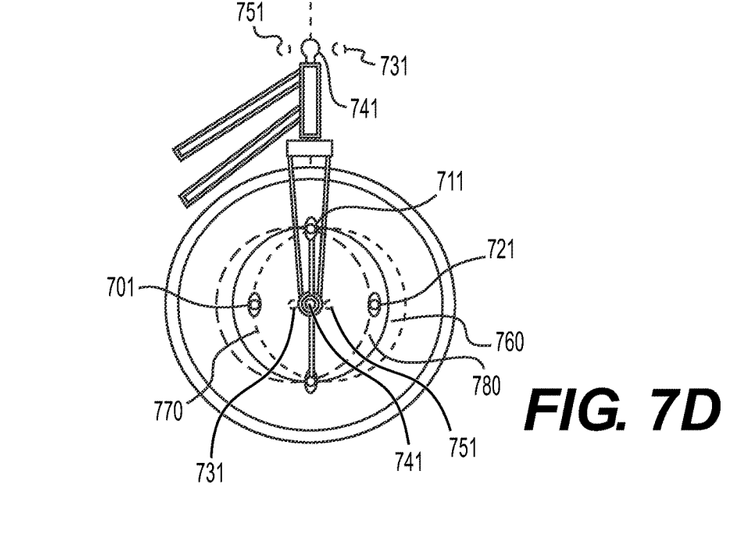
FIG. 7D shows a side view of an embodiment of the invention with coaxial crankset and front wheel to illustrate hand work input as defined by the reduced foot perimeter distance followed.

FIG. 7D shows the effect of the motions of FIGS. 7A-C from the right side view of the fork assembly. The handlebar range of motion as a result of plus and minus 15 degree pivots, is shown by the two dashed circles 731, 751 at either side of the centered handlebar position 741. The corresponding range of crankshaft motion is shown by the two smaller dashed circles shown adjacent to the crankshaft. The three large diameter circles, concentric with each of the three crankshaft positions shown, are the approximate pedal circle perimeters. The center circle 760, having a solid-line is the arc of FIG. 7B. The short-dashed-line circle 770 is the arc of FIG. 7A. The long-dashed-line circle 780 is the arc of FIG. 7C. As a result of the hand induced pivot of the crankshaft about the steering axis and coordinated foot pedal rotation of that crankshaft, as shown if FIGS. 7A-C, a reduced path is traced by the riders foot in the direction of force application. This path is shown as the interior intersection of the short dashed line 770 and long dashed line 780, and is marked by 701, 711 and 721. The amount of work done by hand input is in proportion to the perimeter reduction from that of the full circle perimeter 760.

The rider's arms and legs are reacting against each other through the torques created about the steering axis. The right arm pulls while the right leg pushes, and then vice versa. Ergonomically, this is a satisfying and effective motion. More power can be generated than if the arms and legs were not reacting against each other. Metabolically, the use of large upper and lower body muscles groups together may provide significant aerobic as well as anaerobic benefit. Mechanically, this is a very efficient motion as it decreases the necessary reaction by the bike structure against the riders body thereby reducing flexure losses.

Hand induced pivot of the front fork assembly about the steering axis of plus and minus about 15 degrees is practical. The effective range of angular displacement decreases with increasing ground speed. Empirically, total torque and work based hand power input may approach 50 percent of foot power input. Hand power input can routinely be applied over successive right and left foot pedal strokes, the number of which is often limited by rider's cardiovascular capacity.

Referring now to FIGS. 8A-C, there are shown diagrams that show actual measured data taken from commercial power measurement bicycle pedals. Separate arcs are shown for right and left pedal input. Top Dead Center, TDC, indicates a vertical crank arm position, Bottom Dead Center, BDC, is rotated 180 degrees down.

Each figure shows, as a filled portion of the arc, the input power phase duration. This phase marks the start and end of positive power input during the pedal stroke. The phase also includes an arc length indicated by a wider section of filled pattern. This is described by the manufacturer as the range of "surge" power input measured by the pedals. It is also described by the manufacturer as the range of "peak" power.

FIG. 8A is provided as a basis of comparison. This is actual data recorded while riding a conventional upright high performance road-race type bicycle. The total ride duration was 151 minutes, of which, according to data also recorded and reported by the manufacturer pedal system, 31 minutes were spent standing to pedal. This extended climbing duration is consistent with the aggressive, fast and hilly nature of that ride. These 31 minutes of standing to pedal provided extended opportunity for hand power input.

Explicitly, 810 designates the left pedal, at 812 power input starts, at 814 power input ends, at 816 peak power input starts, at 818 peak power input ends. Similarly, 820 shows the right pedal.

FIG. 8B shows data from a similar ride of the recumbent bike configuration of the Applicant's U.S. Pat. No. 11,142,274. Note that a key difference is that the direction of foot pedal power input is much more horizontal. Which is consistent with the "recumbent" position on the bike which is much more horizontal. This recumbent configuration is capable of substantial supplemental hand power input.

As with FIG. 8A, explicitly, 840 designates the left pedal, at 842 power input starts, at 844 power input ends, at 846 peak power input starts, at 848 peak power input ends. Similarly, 850 shows the right pedal.

FIG. 8C shows data from the embodiment of FIG. 1. Data for the embodiment of FIG. 2 is similar. Note that these data are very different from the previous two figures.

Explicitly, 870 designates the left pedal. At 872 power input starts. At 876 surge power input starts. At 878, which is coincident with 872, a full 360 degrees of pedal rotation has been completed, and both the power and the surge power input end. Similarly, 880 shows the right pedal.

Note that the measurements show power input actually being applied through the full 360 arc of both the left and right pedals. And that most of that arc is the wider filled section, which indicates "surge" or "peak" power input.

This is best explained as being a range of surge power inputs. The embodiments allow hand power to be applied at various points in the foot pedal arc. As with the foot peak inputs of FIGS. 8A and B, this hand input extends over some limited duration of pedal arc. As the rider coordination of hand and foot input phases vary, these surges of supplemental hand power are distributed. This near continuous band of surge power input indicates that over the course of the ride, hand power surges are being applied throughout this range.

The addition of hand power during the return phase of each foot pedal stroke also contributes to the extended range of surge power input shown. Hand induced crankshaft endpoint displacement on the power input phase of one pedal also causes a similar displacement of the opposite crank arm end. Thereby also adding hand power to the return pedal stroke.

In a series of consultations, these results were conveyed to the pedal manufacturer. Representatives were not able to share additional technical detail. They also explained that the embodiment performance data were unlike any they had ever seen.

These embodiments are designed to maximize the riders ability to add supplemental hand power. The data of FIG. 8C shows a dramatic increase in power input consistent with application of supplemental hand power. This input appears superior to that of a conventional upright bicycle, even with extended standing to pedal, and superior to that of the Applicant's previous embodiment.

The pedal system has also measured extended durations in which the embodiment rider was reported to be standing to pedal. This is seen as further evidence of effective hand power input.

A cyclist can learn to ride the embodiment almost immediately. The embodiment is easily held on a steady path, even over extended durations. Pedal force inputs to the steering are easily managed, although insufficient hand pressure application during hard pedal strokes will allow handlebar displacement that reduces pedal input efficiency, just as application of excess hand pressure can increase input power.

As with a recumbent having a frame mounted crankset, and as with an upright bicycle rider that remains seated, embodiment pedal cadence and leg force input can increase for more pedal power input. However, the embodiment allows additional power to be applied by exerting hand force on the handlebar to add force to the leg stroke. And, as with a standing upright bike rider, maximum power is generated by using additional hand force in a rhythmic process to actually rotate the crankset assembly into each pedal stroke. Depending on ground speed, embodiment steering displacement angles up to about plus and minus 15 degrees are practical. These angles are similar to the roll angles used by a standing rider on an upright bike.

Disclosed is a recumbent bicycle and methods of use that allow hand power input comparable to standing and pedaling a conventional upright bicycle. Rather than attempt to eliminate pedal force feedback, the mechanism of pedal steering interaction is managed and used for supplemental hand power propulsion.

While the disclosure contains many specifics, they should not be construed as limitations on the scope, but rather as an exemplification of embodiments thereof. Modifications and variations are possible in light of this disclosure, and further variations may be acquired from practice of the implementations. It is intended that this be covered by the specification and the following claims.

Specific additional embodiments within this scope include use of two rear wheels. Commonly known as a delta tricycle. Here, the vertical steering axis allows hand power pivot without roll. Mechanisms to allow the rear wheels to lean into a turn are also easily accommodated.

Specific additional embodiments within this scope also include a fork mounted aerodynamic front fairing or stabilizing fin having an aerodynamic center of area, as presented to side wind impact, which is ahead of the steering axis. Self-correcting stability is provided because the side wind impact causes an azimuth turning moment away from the wind which in turn causes the bicycle to roll back into the wind, thereby enhancing stability.

I claim:

1. A recumbent bicycle which can be propelled by foot pedals and supplemental hand power, comprising;
   A. a frame which is attached to a front fork such that a steering axis is created about which said front fork is free to pivot with respect to said frame;
   B. a seat which is attached to said frame and located to establish a rider's foot pedal force input direction to be more perpendicular than parallel relative to said steering axis;
   C. at least one rear wheel which is rotatably attached to said frame;
   D. a front wheel which is rotatably attached to said front fork;
   E. a foot pedal crankset comprising a crankshaft, a right crankarm having a first end attached to a right crankshaft endpoint, and a left crankarm having a first end attached to an opposing left crankshaft endpoint, a right pedal attached to a second end of the right crankarm, and a left pedal attached to a second end of the left crankarm;
   F. said foot pedal crankset moves with the front fork as the front fork pivots about the steering axis;
   G. a means for rotational power transmission from said crankset to said front wheel;
   H. a handlebar having a right and left handgrip and having indirect coupling to the fork such that the handlebar axis of rotation can be displaced from the steering axis and the handlebar can transmit force and motion input to the steering axis;
   I. wherein said bicycle is configured so that hand input can be applied to left and right handgrips in coordinated opposition to foot pedal input generating a hand induced force or force and pivot of the front fork and the crankset assembly about the steering axis defining supplemental propulsive power to the crankshaft.

2. The recumbent bicycle of claim 1, wherein the foot pedal crankshaft has an axis of rotation due to foot pedal input that is perpendicular to and intersects the steering axis.

3. The recumbent bicycle of claim 1, wherein the foot pedal crankshaft has an axis of rotation due to foot pedal input that is perpendicular to and is displaced no more than 8 inches ahead of the steering axis.

4. The recumbent bicycle of claim 1, wherein said indirect coupling includes two connecting rods.

5. The recumbent bicycle of claim 1, wherein said indirect coupling includes connective cable.

6. The recumbent bicycle of claim 1, wherein said indirect coupling includes one connecting rod.

7. The recumbent bicycle of claim 1, wherein the steering axis is vertical.

8. The recumbent bicycle of claim 1, wherein said seat establishes a foot pedal force input direction, as defined by a line from the rider's hip joint to said crankset centerline, that is horizontal or inclined up.

9. The recumbent bicycle of claim 1, wherein said seat can be adjusted along the length of the bicycle.

10. The recumbent bicycle of claim 1, wherein said seat has a back which can be adjusted to establish a recline angle of less than 40 degrees to horizontal.

11. The recumbent bicycle of claim 1, wherein the handlebar axis of rotation is parallel to the steering axis.

12. The recumbent bicycle of claim 1, wherein the distance between the handlebar axis of rotation and steering axis can be adjusted.

13. The recumbent bicycle of claim 1, wherein said handlebar right and left handgrips define a line which intersects the handlebar axis of rotation.

14. The recumbent bicycle of claim 1, wherein said foot pedal crankset is located within the perimeter of said front wheel.

15. The recumbent bicycle of claim 1, wherein the front wheel is an aerodynamic disk.

16. A recumbent bicycle which can be propelled by foot pedals and supplemental hand power, comprising;
   A. a frame which is attached to a front fork such that a steering axis is created about which said front fork is free to pivot with respect to said frame;
   B. a seat which is attached to said frame and located to establish a rider's foot pedal force input direction to be more perpendicular than parallel relative to said steering axis;
   C. said steering axis is vertical;
   D. at least one rear wheel which is rotatably attached to said frame;
   E. a front wheel which is rotatably attached to said front fork;
   F. a foot pedal crankset comprising a crankshaft, a right crankarm having a first end attached to a right crankshaft endpoint, and a left crankarm having a first end attached to an opposing left crankshaft endpoint, a right pedal attached to a second end of the right crankarm, and a left pedal attached to a second end of the left crankarm;
G. said foot pedal crankset moves with the front fork as the front fork pivots about the steering axis;
H. said crankshaft has an axis of rotation due to foot pedal input that is perpendicular to and is displaced no more than 8 inches ahead of the steering axis;
I. a means for rotational power transmission from said crankset to said front wheel;
J. a handlebar attached to the front fork having a right and left handgrip, said handlebar and front fork are rigid to torsion created by the rider's hand and foot forces applied in opposition, wherein said handlebar has a handlebar axis of rotation and has indirect attachment to the fork such that the handlebar axis of rotation can be displaced from the steering axis and the handlebar can transmit force and motion input to the steering axis;
K. wherein said bicycle is configured so that hand input can be applied to left and right handgrips in coordinated opposition to foot pedal input generating a hand induced force or force and pivot of the front fork and the crankset assembly about the steering axis defining supplemental propulsive power to the crankshaft.

\* \* \* \* \*